June 9, 1959  H. W. COLE, JR  2,890,304
MERCURY SLIP RING FOR ELECTRICAL APPARATUS
Filed March 6, 1957
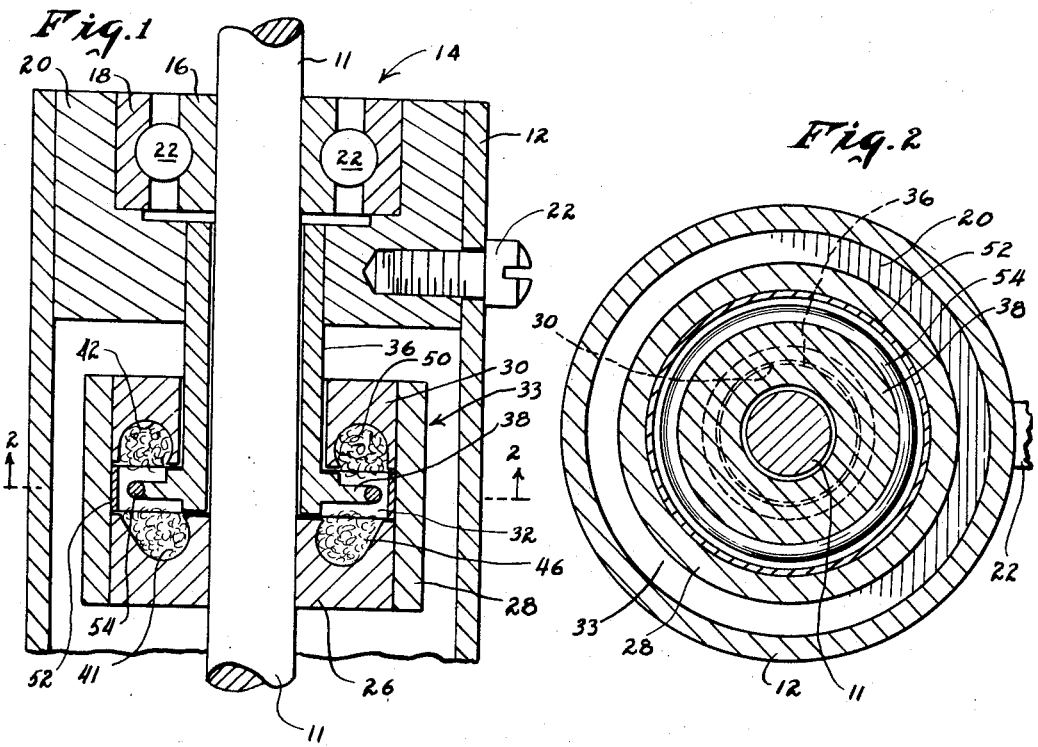
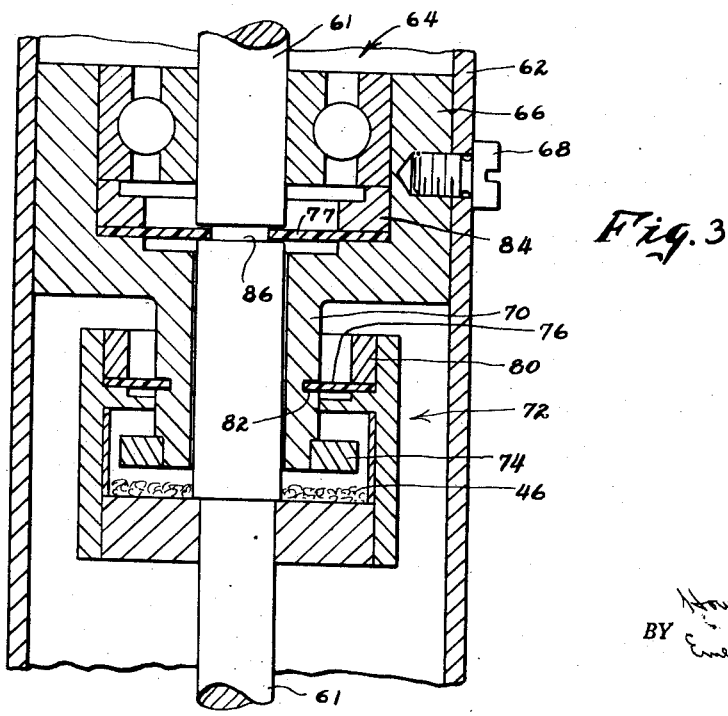
INVENTOR.
Howard W. Cole, Jr.
BY Emery, Whittemore,
Sandoe & Dix
ATTORNEYS

United States Patent Office 2,890,304
Patented June 9, 1959

2,890,304

MERCURY SLIP RING FOR ELECTRICAL APPARATUS

Howard W. Cole, Jr., Mountain Lakes, N.J.

Application March 6, 1957, Serial No. 644,374

11 Claims. (Cl. 200—80)

This invention relates to slip rings which provide a conducting path for electricity from a rotating element to a relatively fixed element.

It is an object of the invention to provide an improved slip ring which can be used for electronic apparatus and which conducts electricity through a continuous path which is not subject to variations in pressure and resistance, such as is encountered with brushes. The slip rings of this invention can be used with shafts rotating at any speed and under conditions of vibration without "brush chatter." Such chatter with brushes of the prior art has introduced noises into electric circuits, making the circuits unsuitable for use with weak signals.

Another object of the invention is to provide a slip ring which uses a conducting liquid to establish a circuit between relatively movable elements; and a more particular object of the invention is to provide a liquid slip ring which will not spill liquid under any circumstances.

Still another object of the invention is to provide an improved mercury slip ring and to prevent spilling of the mercury by holding it in a sponge.

Other objects, features, and advantages of the invention will appear or be pointed out as the description proceeds.

In the drawing, forming a part hereof, in which like reference characters indicate corresponding parts in all the views;

Figure 1 is a sectional view through a slip ring made in accordance with this invention;

Figure 2 is a sectional view taken on the line 2—2 of Figure 1; and

Figure 3 is a view similar to Figure 1 but showing a modified form of the invention.

In Figure 1, the relatively movable elements are a shaft 11 and a casing 12. The casing 12 is usually a fixed element which holds the bearings in which the shaft rotates, but in referring to a "fixed element" herein it will be understood that the term is used to indicate an element which is not moving as a unit with the movable element though it may have other movement, either rotary or movement of translation. For example, the casing 12 may be a part of an airplane or automobile which is itself in motion.

The shaft 11 rotates in an anti-friction bearing 14 having an inner race 16 secured to the shaft 11, an outer race 18 which is carried by a bushing 20, and anti-friction elements, such as balls 22. The bushing 20 is shown secured to the casing 12 by a screw 22, which is merely representative of fastening means.

A flange 26 is secured to the shaft 11 and rotates as a unit with the shaft. A shell 28 surrounds the flange 26 and extends upwardly beyond the flange. There is an inwardly extending ring 30 at the upper end of the shell 28. The flange 26, shell 28 and ring 30 are connected together as a unitary structure and they enclose an annular chamber 32. This unitary structure provides a liquid holder and is designated generally by the reference character 33.

A sleeve 36, attached to the bushing 20, extends downwardly through the open center of the ring 30 and into the chamber 32. At the lower end of this sleeve 36, there is a flange 38. The inside diameter of the sleeve 36 is larger than the shaft 11 so that the sleeve does not touch the shaft. Similarly, the inside diameter of the ring 30 is larger than the outside diameter of the sleeve 36 so that the sleeve does not touch the ring.

Thus, the liquid holder 33 can rotate as a unit with the shaft 11 without having either the shaft or the liquid holder touch the sleeve 36 or its connected flange 38. There is, therefore, no friction or wear between these solid parts.

Within the flange 26, there is a trough 41 and there is a similar trough 42 in the inner face of the ring 30. These troughs 41 and 42 form a part of the chamber 32 enclosed within the liquid holder 33.

A quantity of liquid 46 is enclosed within the chamber 32. The liquid used is preferably mercury. The amount of this liquid 46 is insufficient to fill the troughs 41 and 42. With the apparatus in the position shown in Figure 1, the liquid 46 is in the lower trough 41. If the apparatus is turned upside down, the liquid will flow into the other trough 42.

When the liquid holder 33 rotates at the minimum speed at which the apparatus is intended to be used, centrifugal force moves the liquid 46 outwardly against the side wall of the chamber enclosed within the liquid holder 33. The flange 38 extends close enough to the wall of the chamber so that the liquid 46, when thrown outwardly against the side wall of the chamber, bridges the gap between the periphery of the flange 38 and the side wall of the liquid holder, thus establishing an electric circuit between the parts.

In the preferred construction, the annular troughs 41 and 42 are filled with porous material 50 for holding the liquid against displacement from the liquid holder 33. The annular troughs 41 and 42, even though each is large enough to hold all of the liquid, will not insure that under shock or vibration, the liquid will not be driven out of the liquid holder through the clearance between the ring 30 and the sleeve 36, or between the shaft 11 and the sleeve 36. The porous material, which is preferably loosely packed metallic wool, provides many small spaces for the liquid to occupy rather than one large space. This is particularly effective with mercury because mercury has a very high surface tension. The wool, in effect, breaks the mercury into small particles of low weight so that the surface tension is more than adequate to withstand very high shock and vibration without having any of the mercury displaced from the liquid holder 33. For liquids with lower surface tension, material more closely packed, or with smaller pores may be used, depending upon the amount of vibration and shock which the apparatus must withstand.

Under the action of sustained centrifugal force, the mercury or other liquid 46 is displaced outwardly where it flows together to form a single large mass that provides an uninterrupted electrical path between the flange 38 and the side of the chamber in the liquid holder 33. When the porous material 50 is metallic wool, it does not matter whether the metallic wool extends into the clearance between the flange 38 and the side of the liquid holder because the wool itself is a conductor.

When mercury is used, the mercury moves along the strands of the metal wool without impedance from surface tension, if a mercury-wettable metallic wool such as copper or brass wool; and by having a mercury-wettable inside lining 52 in the chamber of the liquid holder 33, and a mercury-wettable ring 54 forming the periphery of the flange 38.

The metallic wool can be thought of as a sponge for the mercury. It is well known that a sponge will not spill, and this prevents any leakage of mercury along the clearance between the ring 30 and the sleeve 36, or between the shaft 11 and the sleeve 36. The mercury can be wrung from the sponge by the centrifugal force produced when the liquid holder 33 rotates.

Figure 3 shows a modified form of the invention. A shaft 61 extends through a casing 62 and turns in antifriction bearings 64. These bearings are held in a bushing 66 secured to the casing by a screw 68. A sleeve 70 extends downwardly from the bushing 66 into a liquid holder 72 connected to the shaft 61.

There is a flange 74 on the lower end of the sleeve 70 in a chamber enclosed by the liquid holder 72.

The modified construction shown in Figure 3 has liquid, preferably mercury 46, enclosed within the liquid holder 72 and this liquid is thrown outwardly against the sides of the chamber by centrifugal force to provide a liquid bridge across the gap between the periphery of the flange 74 and the inside wall of the liquid holder 72 when the shaft 61 is rotating, in a manner similar to that already described in connection with Figure 1.

Instead of using annular troughs at opposite sides of the chamber in the liquid holder 72, the structure of Figure 3 uses plastic seals 76 and 77. The seal 76 is clamped between the outside surface of a wall of the liquid holder 72 and a clamping ring 80. Thus, the seal 76 rotates as a unit with the liquid holder 72. Its inner edge runs in a circumferential groove 82 in the outside surface of the sleeve 70. This provides, in effect, a packing around the sleeve with low friction but with only a running clearance through which the liquid 46 can not escape.

The seal 77 is clamped against the bottom of a counterbore of the bushing 66 by a clamping ring 84; and this seal 77 extends into a circumferential groove 86 in the shaft 61. As in the case of the seal 76, there is only a running clearance between the inner edge of the seal 77 and the bottom of the circumferential groove 86, so that the liquid 46 can not escape along the shaft 61.

The preferred construction has been illustrated and described, but changes and modifications can be made and some features can be used in different combinations without departing from the invention as defined in the claims.

What is claimed is:

1. A high-speed slip ring for providing an electrically conducting path between an element that rotates about an axis and a relatively fixed element of electrical apparatus, said slip ring including a liquid holder having a chamber therein, a wall at one end of the chamber, the holder being secured to the rotating element for rotation therewith about said axis, a contact ring connected to the relatively fixed element and having a circumferential portion located in the chamber and spaced inwardly from the side of the chamber in a direction along a radius from said axis, and an electrically conducting liquid in the chamber, the quantity of liquid being sufficient to fill the radial space between the contact ring and the side of the chamber when the liquid is thrown outwardly against the side of the chamber by centrifugal force generated by rotation of the liquid holder about said axis.

2. The high-speed slip ring described in claim 1, and in which the rotating element is a shaft and the chamber in the liquid holder is of substantially circular cross section, the chamber being closed at one end by the wall and having a longitudinal axis substantially co-incident with the axis of the shaft, said shaft extending through the wall.

3. The high-speed slip ring described in claim 2, and in which the end wall of the liquid holder fits around the shaft with a press fit, and in which there is a relatively stationary sleeve through which the shaft passes with running clearance, and the contact ring is a flange at one end of the sleeve, the diameter of the flange being less than the diameter of the chamber so as to leave a radial clearance which provides the spacing of the contact ring from the side of the chamber.

4. The high-speed slip ring described in claim 2, and in which there is an anti-friction bearing in which the shaft turns, the anti-friction bearing having an outer fixed portion, a sleeve surrounding the shaft with running clearance for the shaft, the sleeve being connected at one end with the fixed portion of the bearing, and a flange at the other end of the sleeve, said flange constituting the contact ring in the chamber and having a diameter less than the diameter of the chamber to leave a radial clearance which constitutes the space between the contact ring and the side of the chamber, the end wall of the chamber fitting around the shaft with a press-fit and constituting a connection between the liquid holder and the shaft for causing the liquid holder to rotate as a unit with the shaft.

5. The high-speed slip ring described in claim 1, and in which at least a portion of the chamber is filled with porous material for retaining the liquid in the chamber in spite of vibration and changes in the orientation of the slip ring.

6. A high-speed mercury slip ring for providing an electrically conducting path between a rotatary element and a relatively fixed element, said slip ring including a holder having a chamber therein of circular cross section for holding the mercury, a wall at one end of the chamber, a connection between the mercury holder and the rotating element for causing the mercury holder to turn as a unit with the rotating element, a contact ring located in the chamber and spaced inwardly from the side of the chamber in a direction toward the axis of rotation of the rotary element, a quantity of liquid in the chamber sufficient to form a layer of mercury held by centrifugal force around the entire circumferential extent of the side of the chamber, which layer is of a depth that bridges the radial space between the contact ring and the side of the mercury chamber.

7. The high-speed mercury ring described in claim 6, and in which the rotating element is a shaft, and the chamber at the region of the contact ring is of circular cross section with a longitudinal axis substantially co-incident with the axis of rotation of the shaft, the chamber being closed except for an inwardly facing annular opening intermediate the opposite ends of the chamber so as to leave an annular cavity at each end of the chamber, each end cavity being large enough to hold all of the free mercury in the chamber when the chamber is oriented to locate that cavity lowermost in the chamber, the contact ring being of less diameter than the chamber so as to provide the space between the contact ring and the side of the chamber.

8. The high-speed mercury slip ring described in claim 6, and in which the rotating element is a shaft and the mercury holder is secured to the shaft for rotation as a unit therewith, and in which the chamber is of circular cross section with a longitudinal axis substantially co-incident with the axis of rotation of the shaft, the shaft extending through the end wall, and in which the relatively fixed element is a sleeve surrounding the shaft with running clearance and the contact ring is a flange secured to the shaft and of less diameter than the chamber to provide the space between the ring and chamber, and in which there is a packing ring closing the end of the chamber remote from said wall.

9. The high-speed mercury slip ring described in claim 7 and in which the shaft extends through the end wall and the chamber is closed at one end by said end wall, and in which there are anti-friction bearings in which the shaft rotates, the bearing including a fixed outer race, a holder for the outer race, a sleeve secured to the holder and surrounding the shaft with running clearance from the shaft, a flange adjacent to one end of the sleeve, the flange constituting the contact ring in the chamber, at least the peripheral portion of the flange having a mercury wettable surface, a mercury wettable lining constituting the surface of the chamber nearest to the flange, and metal wool in the end cavities, the metal wool being made of mercury wettable metal.

10. The high-speed mercury slip ring described in claim 6, and in which the chamber is at least partially filled with metal wool.

11. The high-speed mercury slip ring described in claim 10, and in which the metal wool is made of metal from the group consisting of copper and brass, and there is a mercury wettable surface around the peripheral portion of the contact ring and over the area of the side of the chamber which is nearest to the periphery of the contact ring.

References Cited in the file of this patent

UNITED STATES PATENTS 1,498,113     Olds  ------------------ June 17, 1924